(12) United States Patent
Herbst et al.

(10) Patent No.: US 7,882,390 B2
(45) Date of Patent: Feb. 1, 2011

(54) REPAIR OF DEFECTIVE SERVO TRACKS

(75) Inventors: Gary A. Herbst, San Jose, CA (US);
Jong-Ming Lin, Cupertino, CA (US);
Michael A. Moser, San Jose, CA (US);
Matthew T. White, Mountain View, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 496 days.

(21) Appl. No.: 12/006,407

(22) Filed: Dec. 31, 2007

(65) Prior Publication Data
US 2009/0168226 A1 Jul. 2, 2009

(51) Int. Cl.
*G06F 11/00* (2006.01)
(52) U.S. Cl. ............... 714/8; 714/7; 360/77.04
(58) Field of Classification Search .......... 714/7, 714/8; 360/77.04
See application file for complete search history.

(56) References Cited

U.S. PATENT DOCUMENTS

| | | | |
|---|---|---|---|
| 5,553,086 | A | 9/1996 | Sompel et al. |
| 5,710,677 | A * | 1/1998 | Teng et al. ............. 360/77.08 |
| 5,870,243 | A * | 2/1999 | Ukani et al. ............ 360/77.08 |
| 5,889,631 | A | 3/1999 | Hobson |
| 6,000,018 | A | 12/1999 | Packer et al. |
| 6,049,440 | A | 4/2000 | Shu |
| 6,108,156 | A | 8/2000 | Lee et al. |
| 6,181,500 | B1 * | 1/2001 | Serrano et al. ............. 360/53 |
| 6,295,176 | B1 | 9/2001 | Reddy et al. |
| 6,384,999 | B1 * | 5/2002 | Schibilla .................. 360/53 |
| 6,392,831 | B1 * | 5/2002 | Yeo et al. .................. 360/53 |
| 6,760,170 | B2 | 7/2004 | Siew et al. |
| 6,903,888 | B2 | 6/2005 | Leigh et al. |
| 6,995,943 | B1 * | 2/2006 | Shrestha et al. ......... 360/77.08 |
| 2005/0073770 | A1 * | 4/2005 | Ehrlich et al. ............. 360/75 |

OTHER PUBLICATIONS

Schindler, et al., "Track-aligned Extents: Matching Access Patterns to Disk Drive Characteristics", *Usenix: Proceedings*, (Nov. 21, 2001),259-274.
Operating Systems, et al., "Bad Sector in HDD", *Operating Systems Miscellaneous*, (Jul. 10, 2007),1-14.
Yec, et al., "FAQ Products", *YEC Co., Ltd.*, (Jul. 10, 2007),1-3.
Terasci Industries, Inc., et al., "Services", *TeraSci System Specifications*, (2004),1-2.

* cited by examiner

*Primary Examiner*—Philip Guyton (57) ABSTRACT

A method for repairing at least one defective servo segment of a servo sector having at least one defective servo track written on a magnetic recording media. The method comprises mapping the magnetic recording media for locations of the defective servo segment of the servo sector. A non-defective segment of the servo sector is replicated at least once on the magnetic recording media in a customer data zone, thereby creating at least one good servo segment copy of the servo sector. The good servo segment copy is propagated through the customer data zone associated with the defective servo segment. The good servo segment copy is copied onto the magnetic recording media previously occupied by the defective servo segment of the servo sector.

18 Claims, 8 Drawing Sheets

FIG. 5 ium of data that can be stored on a disk is governed by many well-known physical principles. One factor in determining the amount of data that can be stored in an HDD is the ability of the magnetic transducer to write closely spaced data tracks onto the disk surface. The spacing of tracks on a disk surface is known as track pitch, and the unit of measure for expressing the density of tracks on a disk is tracks per inch or TPI. A smaller track pitch results in a higher TPI. The servo system of the HDD enables in part the magnetic transducer to be precisely positioned at a radius on the disk to write a data track, enabling adjacent data tracks to be written with a high TPI.

REPAIR OF DEFECTIVE SERVO TRACKS

TECHNICAL FIELD

This invention relates generally to the field of direct access storage devices and in particular to repairing defective servo tracks having poor quality, of a servo segment in a servo sector whereby substantially no more than the defective servo track having poor quality is erased and rewritten.

BACKGROUND

Direct access storage devices (DASD) have become part of everyday life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

The amount of data that can be stored on a disk is governed by many well-known physical principles. One factor in determining the amount of data that can be stored in an HDD is the ability of the magnetic transducer to write closely spaced data tracks onto the disk surface. The spacing of tracks on a disk surface is known as track pitch, and the unit of measure for expressing the density of tracks on a disk is tracks per inch or TPI. A smaller track pitch results in a higher TPI. The servo system of the HDD enables in part the magnetic transducer to be precisely positioned at a radius on the disk to write a data track, enabling adjacent data tracks to be written with a high TPI.

Coded information is written at every radius on a disk where a data track will be written. This coded information is used to identify the location of data to be written on the magnetic recording media of the disk. Once the data is written, the coded information is used to locate the written data so that it can be read. This coded information is known as servo data. Servo data identifies the location of the track with respect to its order of radius from the disk's center of rotation and its sector in a circumferential distance from an index around the disk. The process of writing servo data is known in the art as servowrite.

The majority of the servowrite processes used today comprise a magnetic transducer writing a servo track at each sector of each radius of a potential data track. The servowrite process is typically a time consuming process and depending upon the design of the HDD can require several hours per HDD to accomplish. Today's demands for higher TPI increase the time required for servowrite. For various reasons such as mechanical vibrations, thermal transients, and other such disturbances that move the magnetic transducer in an undesirable manner, servo data can have poor quality. All HDDs have their own criteria for the allowable quantity, density, and distribution of poor quality servo sites. These criteria are dependent upon the HDD design and manufacturer. In today's art of servowriting, if a servo poor quality criterion is exceeded, repairing servo poor quality requires that all servo data be erased and the servowrite process restarted. A servo poor quality criterion determines if a servo track is defective.

SUMMARY OF THE INVENTION

Various embodiments of the present invention are described herein. A method for repairing at least one defective servo segment of a servo sector having at least one defective servo track written on a magnetic recording media. The method comprises mapping the magnetic recording media for locations of the defective servo segment of the servo sector. A non-defective segment of the servo sector is replicated at least once on the magnetic recording media in a customer data zone, thereby creating at least one good servo segment copy of the servo sector. The good servo segment copy is propagated through the customer data zone associated with the defective servo segment. The good servo segment copy is copied onto the magnetic recording media previously occupied by the defective servo segment of the servo sector.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a brief overview of a hard disk drive (HDD) which comprises a head gimbal assembly (HGA) having a magnetic transducer operable to writing and reading servo data and repairing servo data in accordance with embodiments of the present invention. The discussion will then focus on embodiments of the present invention in which at least one defective servo segment of a servo sector having at least one defective servo track written on a magnetic recording media is repaired. The implementation of embodiments of the present invention will then be discussed.

OVERVIEW

Figure 1:
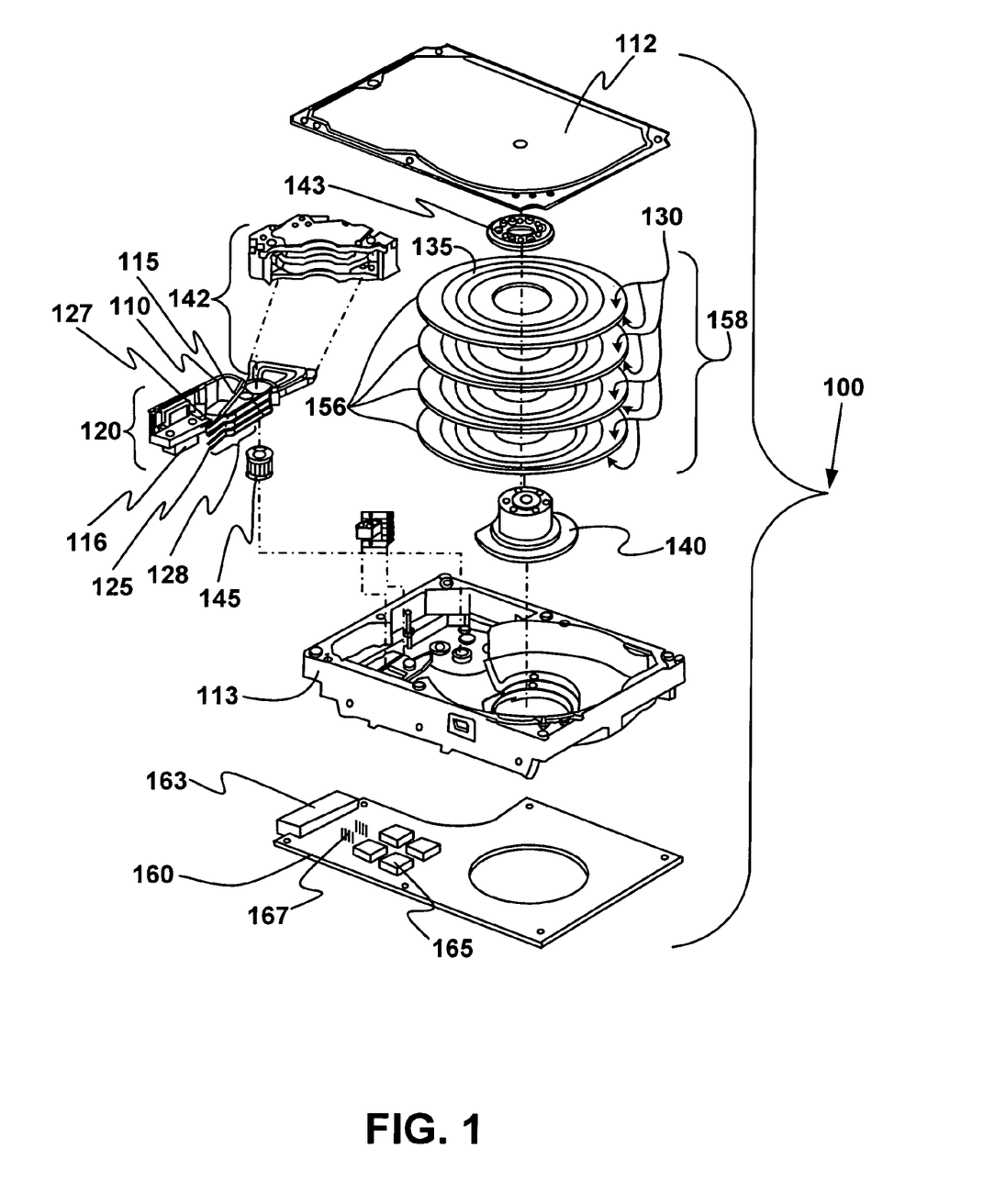
FIG. 1 is an isometric blow-apart of an HDD in accordance with one embodiment of the present invention.

With reference to FIG. 1, an isometric blow-apart of HDD 100 is presented in accordance with an embodiment of this invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, sometimes referred to as an actuator assembly or carriage, comprises at least one head gimbal assembly (HGA) 128, flex cable 110, HSA connector 116, suspension 127, and arm electronics (A/E) module 115. HGA 128 comprises suspension 127, which suspends hard disk drive slider 125 next to disk surface 130. Hard disk drive slider 125 is coupled with suspension 127. Flex cable 110, which is part of HSA 120, conveys data between HSA connector 116 and A/E module 115. A/E module 115 comprises a write channel and a read channel which energize a magnetic transducer coupled to slider 125 for writing and reading data from disk surface 130. HSA connector 116 also conveys control data between printed circuit board (PCB) 160 and VCM 142.

HSA 120 is coupled pivotally with base casting 113 by means of pivot bearing 145, such that VCM 142 can move HGA 128 with slider 125 arcuately across disk surface 130, thereby accessing data tracks 135. Upon assembly of HSA 120, disk stack 158, VCM 142, and other components with base casting 113, cover 112 is coupled with base casting 113 to enclose these components and sub-assemblies into HDD 100.

Once cover 112 is coupled with base casting 113, PCB 160 is coupled to base casting 113. PCB 160 comprises at least one electrical component 165 which in general performs the electrical tasks of HDD 100, such as servo control of VCM 142, status check of HDD 100 before writing data, and power control for sub-assemblies within HDD 100. HGA 128 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160.

Figure 2:
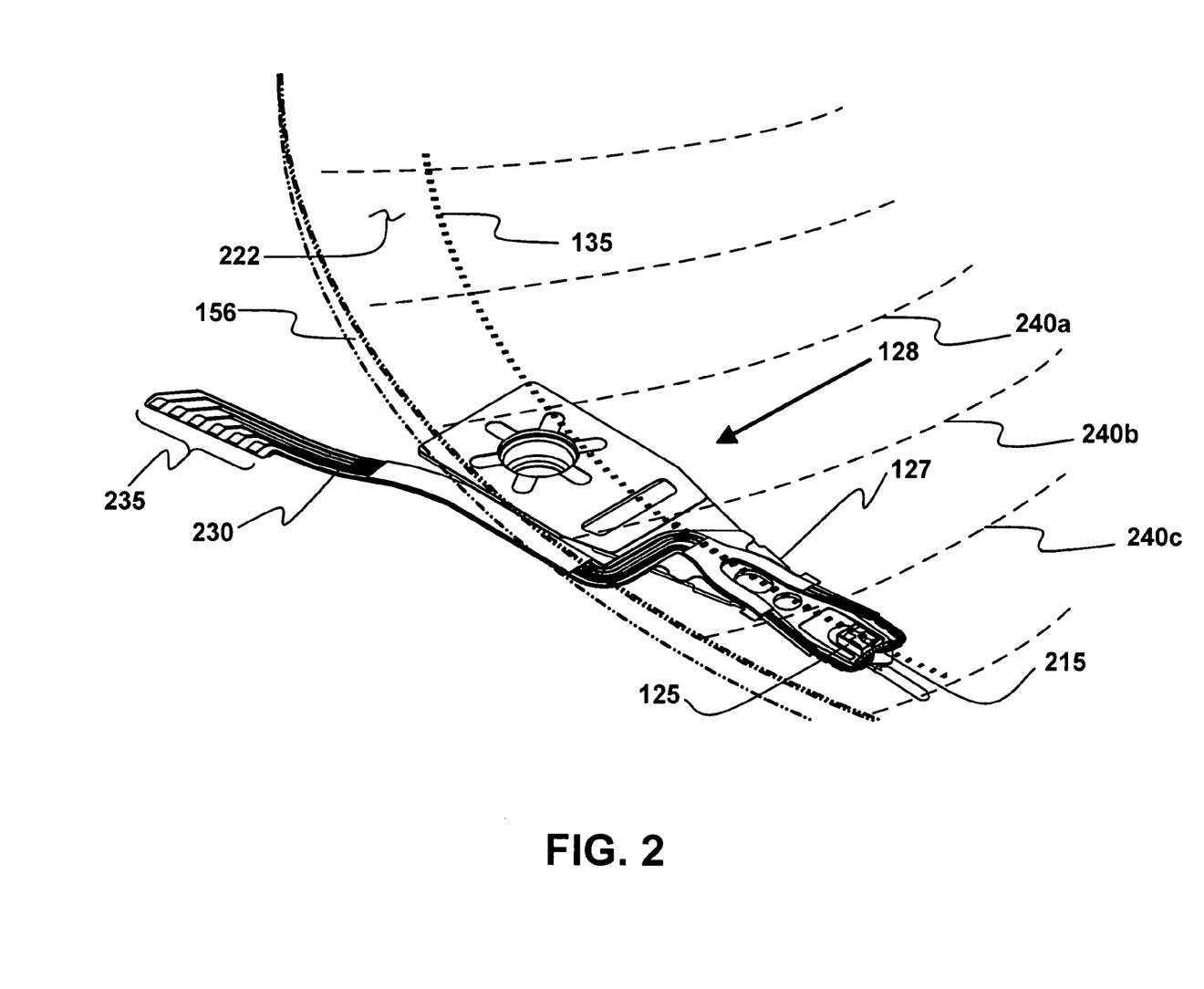
FIG. 2 is an isometric of head gimbal assembly (HGA), a disk, and servo sectors in accordance with one embodiment of the present invention.

With reference to FIG. 2, an isometric of HGA 128 and disk 156 is presented in accordance with one embodiment of the present invention. Disk 156 is presented with phantom lines so that magnetic recording media 222, servo sector (240a, 240b, 240c), magnetic recording data track 135, and features of HGA 128 that face disk 156 are visible. Servo sector (240a, 240b, 240c) and magnetic recording data track 135 are written onto magnetic recording media 222. Commands from A/E module 115 for writing data track 135 are transmitted to magnetic transducer 215 via conductors 230. Conductors 230 also transmit data read by magnetic transducer 215 from servo sector (240a, 240b, 240c) and magnetic recording data track 135 via conductors 230 to A/E module 115.

Data tracks 135 comprise data recorded by a customer or user of HDD 100. Prior to recording data track 135 on magnetic recording media 222, servo sector (240a, 240b, 240c) is written onto magnetic recording media 222. Servo sector (240a, 240b, 240c) is used to locate customer data written on magnetic recording media 222. There exist several processes for writing servo sector (240a, 240b, 240c) that are well known and understood in the art. In general, a process for writing servo sector (240a, 240b, 240c) onto recording media 222 is known as servowrite. Examples of servowrite processes well known in the art are pack writing, clock head writing, non-clock head writing, media writing, gang/bank writing, printed media, and self servowrite.

Each servowrite process is prone to poor quality which may render an area of magnetic recording media 222 inaccessible for storing customer data. Depending upon the design and performance expectations of HDD 100, a poor quality criterion for density and location of poor quality sites in servo sector (240a, 240b, 240c) is specified. If the specified poor quality criterion is exceeded, the currently known rework process is to erase magnetic recording media 222 of all servo sectors such as 240a, 240b, and 240c, and try servowriting magnetic recording media 222 again with fewer poor quality sites or a more acceptable poor quality site density.

For the sake of brevity and clarity, self servowrite will be described as an example of a servowrite process in which poor quality sites can arise. It is appreciated and understood that all servowrite processes can produce poor quality sites. Embodiments of the present invention can benefit all servowrite processes. Since self servowrite is well known and understood by one of ordinary skill in the art, the following description is not intended to be an all inclusive detailed description of self servowrite.

Self servowrite can be performed within HDD 100. One magnetic transducer 215 in HSA 120 receives a timing signal, which is transmitted through soldering pads 235 and conductors 230, and writes a small initial segment of servo sector (240a, 240b, 240c). Using a process known as bootstrapping, magnetic transducer 215 reads the small initial segment of servo sector (240a, 240b, 240c). Using VCM 142, magnetic transducer 215 is positioned with respect to the just written small initial segment of servo sector (240a, 240b, 240c). Magnetic transducer 215 then writes a copy of the small initial segment of servo sector (240a, 240b, 240c) at an end of the small initial segment of servo sector (240a, 240b, 240c). In this reading and writing manner, the small initial segment of servo sector (240a, 240b, 240c) is propagated in one continuous servo sector (240a, 240b, 240c) extending from ID to OD of disk 156. The propagation of small initial segments of servo sector (240a, 240b, 240c) is repeated for every servo sector (240a, 240b, 240c) required on disk surface 130. After the first disk surface 130 is servowritten, the remaining disk surfaces 130 in disk stack 158 are servowritten using the first disk surface 130 as a reference pattern.

The servowriting of subsequent disk surfaces 130 is accomplished by reading the initially servowritten disk surface 130 and writing copies of servo sector (240a, 240b, 240c) onto another disk surface 130 in disk stack 158. The writing of copies of servo sector (240a, 240b, 240c) is accomplished with the magnetic transducers 215 associated with the other disk surface 130 on which copies of servo sector (240a, 240b, 240c) are to be written. In the self servowrite process the HGA which is reading servo sector (240a, 240b, 240c) to be copied from the initially servo written disk surface 130 is known as the reference HGA. The HGAs which are copying servo sector (240a, 240b, 240c) from the initially servowritten disk surface 130 and copying servo sector (240a, 240b, 240c) onto another disk surface 130 in disk stack 158 is known as the replicating HGA.

Poor quality sites can arise in the self servo write process from relative motion between the reference HGA and the replicating HGA. There are many causes of this relative motion. An example of a cause of relative motion is non-uniform thermal loading across HSA 120 which can cause magnetic transducer 215 associated with a replicating HGA to move differently than magnetic transducer 215 associated with the reference HGA or another replicating HGA. Another example of a cause for relative motion is the small mechanical differences between HGAs that result from manufacturing tolerances and assembly tolerances. These small mechanical differences from HGA to HGA result in small differences in dynamic performance and vibration characteristics from HGA to HGA. These resulting small deviations in dynamic performance and vibration characteristics can position a magnetic transducer 215 of a replicating HGA in a location different from the location of the magnetic transducer 215 of a reference HGA which will result in poor quality in propagated and copied servo sector (240a, 240b, 240c).

Physical Description

Figure 3:
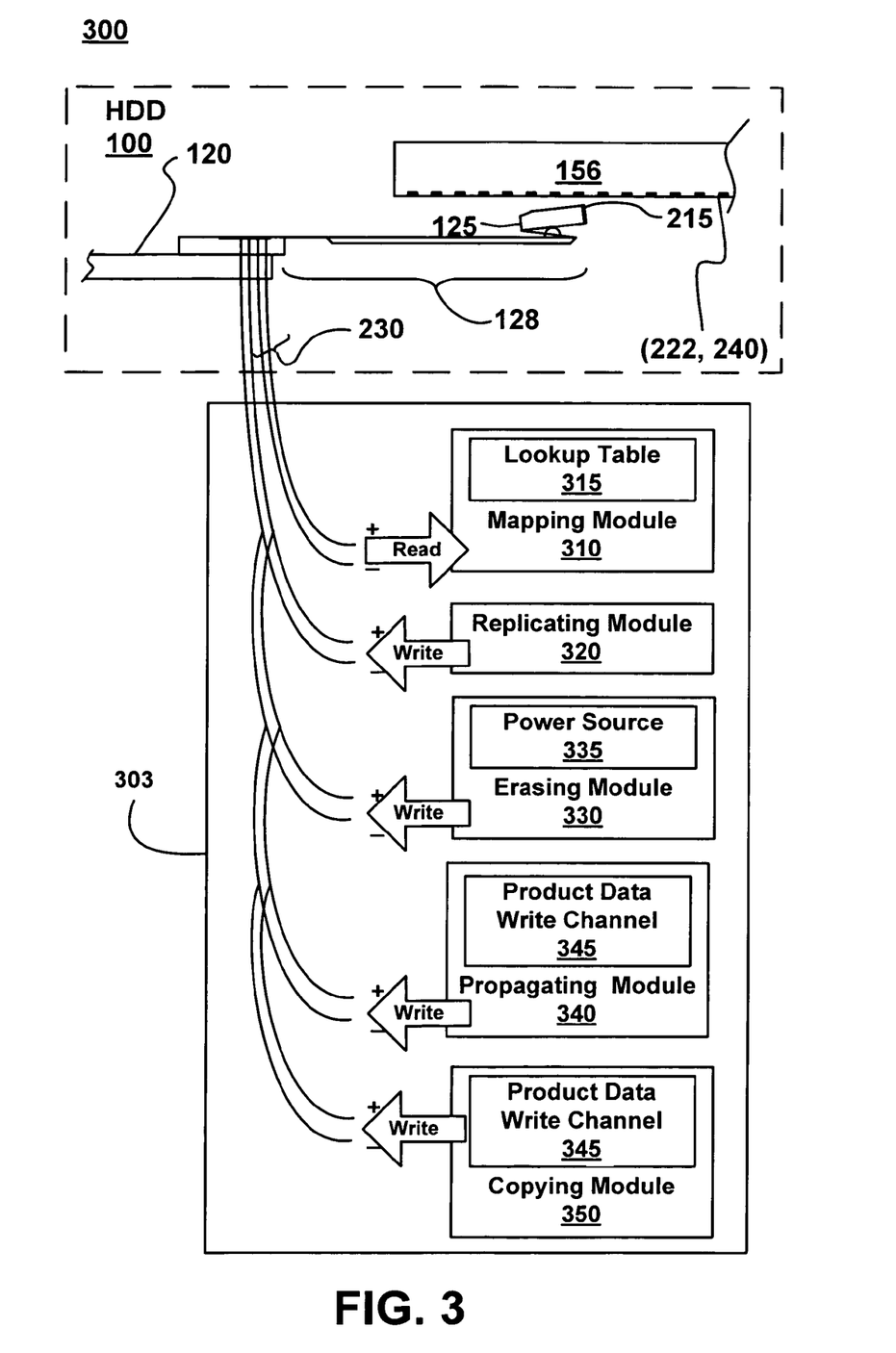
FIG. 3 is a block diagram of a system for repairing a defective servo segment of a servo sector written on a magnetic recording media in accordance with one embodiment of the present invention.

With reference to FIG. 3, block diagram 300, which illustrates system 303 for repairing a defective servo segment of servo sector (240a, 240b, 240c) written on magnetic recording media 222, is presented in accordance with one embodiment of the present invention. System 303 will be described with reference to elements shown in FIG. 1 and FIG. 2.

In accordance with an embodiment of the present invention, system 303 is coupled with a servowrite apparatus, such as HDD 100, via conductors 230 of at least one HGA 128. HGA 128 comprises magnetic transducer 215 which is configured for reading information from magnetic recording media 222, such as that contained in servo sector (240a, 240b, 240c), and for writing information to magnetic recording media 222, such as that comprising servo sector (240a, 240b, 240c). With reference to FIG. 1, HDD 100 comprises disk stack 158 and HSA 120, which are assembled in their designed association with each other. HDD 100 can benefit from embodiments of the present invention at the HDD level of assembly.

In accordance with an embodiment of the present invention, system 303 is coupled with a servowrite apparatus, such as a pack writer, via conductors 230 of at least one HGA 128. HGA 128 comprises magnetic transducer 215 which is configured for reading information from magnetic recording media 222, such as that contained in servo sector (240a, 240b, 240c), and for writing information to magnetic recording media 222, such as that comprising servo sector (240a, 240b, 240c). A pack writer comprises a disk stack, such as disk stack 158 as presented in FIG. 1 and at least one HGA 128. Disk stack 158 can benefit from embodiments of the present invention at the disk stack level of assembly.

In accordance with an embodiment of the present invention, system 303 is coupled with a servowrite apparatus, such as a media writer, via conductors 230 of at least one HGA 128. HGA 128 comprises magnetic transducer 215 which is configured for reading information from magnetic recording media 222, such as that contained in servo sector (240a, 240b, 240c), and for writing information to magnetic recording media 222, such as that comprising servo sector (240a, 240b, 240c). A media writer comprises a disk, such as disk 156 as presented in FIG. 1 and at least one HGA 128. Disk 156 can benefit from embodiments of the present invention at the disk component level.

In accordance with an embodiment of the present invention, system 303 comprises mapping module 310 configured for locating and recording a location of a defective servo segment of servo sector (240a, 240b, 240c) on magnetic recording media 222. In accordance with another embodiment of the present invention, mapping module 310 is coupled with HSA 120 and comprises lookup table 315 which is configured for storing the location of the defective segment of servo sector (240a, 240b, 240c) on magnetic recording media 222. With reference to FIG. 1 mapping module 310 can reside in part or in total in A/E module 115 and/or in part or in total in at least one electrical component 165 on PCB 160. In mapping the locations of defective servo segments of servo sector (240a, 240b, 240c), the locations on magnetic recording media 222 can be identified and located for applying the benefits of embodiments of the present invention for repairing a defective servo track within servo sector (240a, 240b, 240c).

In accordance with an embodiment of the present invention, system 303 comprises replicating module 320 configured for replicating a non-defective segment of servo sector (240a, 240b, 240c) at least once on magnetic recording media 222 in a customer data zone, thereby creating at least one good servo segment copy of servo sector (240a, 240b, 240c). Replicating module 320 replicates the good servo segment copy at a location in the customer data zone on magnetic recording media 222 in accordance with the location of a defective servo segment of servo sector (240a, 240b, 240c) identified by mapping module 310.

In accordance with an embodiment of the present invention, system 303 comprises erasing module 330 configured for erasing the defective servo segment of servo sector (240a, 240b, 240c) written on magnetic recording media 222. Erasing module 330 erases the defective servo segment of servo sector (240a, 240b, 240c) written on magnetic recording media 222 in accordance with the location of a defective servo segment of servo sector (240a, 240b, 240c) identified by mapping module 310. In accordance with another embodiment of the present invention, erasing module 330 comprises power source 335 configured for energizing magnetic transducer 215 whereby the defective segment can be erased. Power source 335 can be a DC power source or an AC power source.

In accordance with an embodiment of the present invention, system 303 comprises propagating module 340 configured for propagating the good servo segment copy through the customer data zone associated with the defective servo segment. In accordance with another embodiment of the present invention, propagating module 340 is coupled with HSA 120 and comprises product data write channel 345. Product data write channel 345 is configured for energizing magnetic transducer 215. With reference to FIG. 1 propagating module 340 can reside in part or in total in A/E module 115 and/or in part or in total in at least one electrical component 165 on PCB 160. In energizing magnetic transducer 215 with product data write channel 345, the good servo segment copy can be propagated through the customer data zone associated with the defective servo segment of servo sector (240a, 240b, 240c).

In accordance with an embodiment of the present invention, system 303 comprises copying module 350 configured for copying the good servo segment copy from servo sector (240a, 240b, 240c) onto magnetic recording media 222 previously occupied by the defective servo segment of servo sector (240a, 240b, 240c). In accordance with another embodiment of the present invention, copying module 350 comprises product data write channel 345 coupled with HSA 120 and comprises product data write channel 345. Product data write channel 345 is configured for energizing magnetic transducer 215. With reference to FIG. 1 propagating module 340 can reside in part or in total in A/E module 115 and/or in part or in total in at least one electrical component 165 on PCB 160. In energizing magnetic transducer 215 with product data write channel 345, the good servo segment copy can be written onto magnetic recording media 222 previously occupied by the defective servo segment of servo sector (240a, 240b, 240c).

Operation

Embodiments of the present invention enable the repair of at least one defective servo track in at least one servo sector by mapping the location of the defective servo track, replicating a good segment of the servo sector that is close to the defective servo track, erasing the defective servo track, and copying the good segment of the servo sector onto the area of the magnetic recording media that was previously occupied by the defective servo track. Embodiments of the present invention eliminate the current practice of repairing a defective servo track, by erasing substantially the entire magnetic recording media containing the defective servo track and restarting the servowrite process.

Figure 4A:
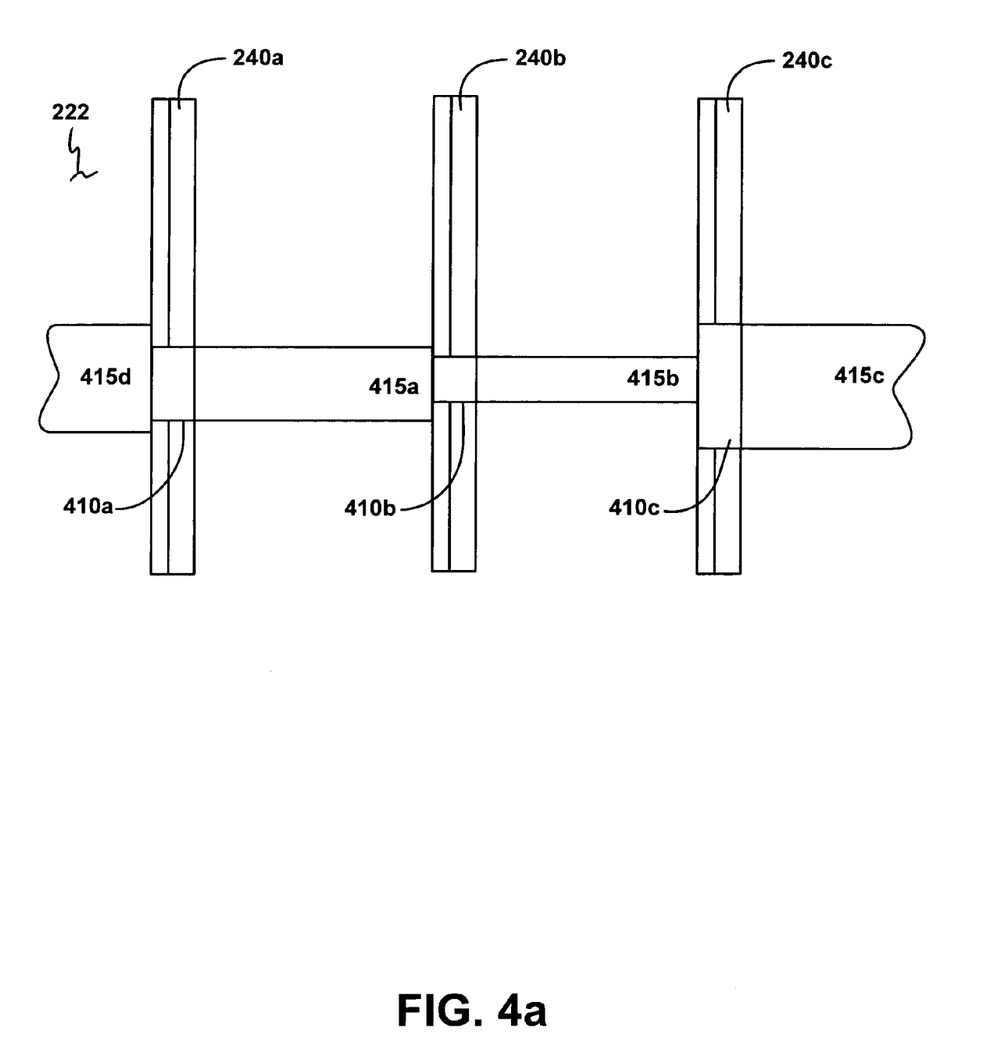
FIG. 4a is a diagram of defective servo segments written on a magnetic recording media which are operable to embodiments of the present invention.

FIG. 4a is a diagram of defective servo segments 410a, 410b, and 410c written on magnetic recording media 222 which are operable to embodiments of the present invention. Defective servo segments 410a, 410b, and 410c represent three defective servo segments of three servo sectors 240a, 240b and 240c written on one magnetic recording media 222. Defective servo segment (410a, 410b, 410c) renders magnetic recording media 222 in customer data zone (415a, 415b, 415c, 415d) inaccessible and unusable, since there is no servo tracks associated with customer data zone (415a, 415b, 415c, 415d) that would enable customer data to be located for writing or reading customer data in customer data zone (415a, 415b, 415c, 415d). The defective servo segment associated with customer data zone 415d is not show in FIG. 4a. It is appreciated that any defective servo segment has an associated customer data zone which is inaccessible and unusable.

Defective servo segments such as defective servo segments 410a, 410b, and 410c typically occur at a radius similar to each other. This is due in part to the dynamic response of a replicating HGA being dependant upon its position within disk stack 158. HGA 128 will be exposed to excitation forces that vary with radial positions in disk stack 158 as well as varying with the position of HGA 128 in HSA 120. These forces are well known and understood by one of ordinary skill in the art. Examples of such forces are: disk flutter; air turbulence; HSA butterfly and system modes of vibration; and varying thermal conduction and/or convection which can vary thermal expansion of HSA 120.

Figure 5:
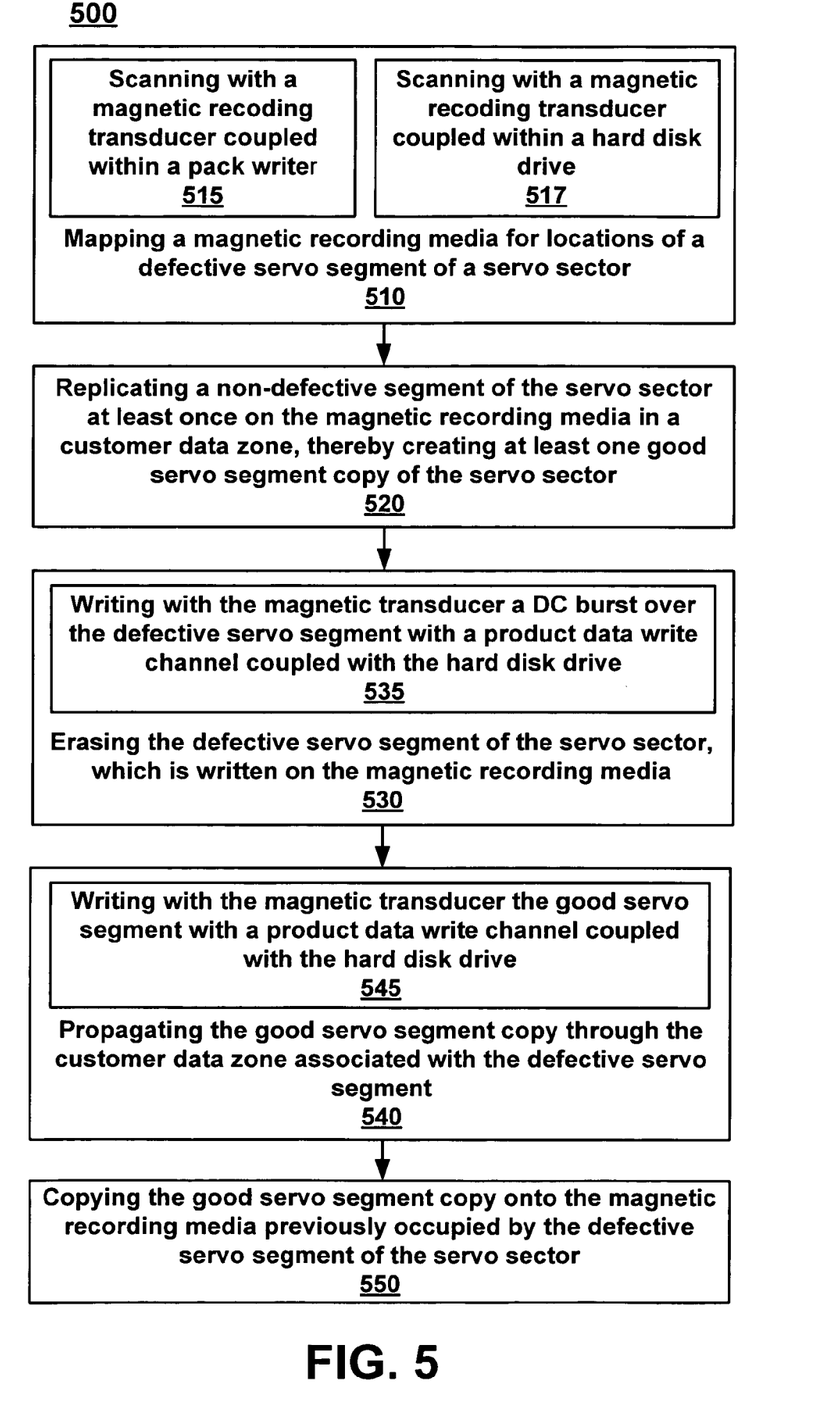
FIG. 5 is a flow chart illustrating a process for repairing a defective servo segment written on a magnetic recording media in accordance with one embodiment of the present invention.

FIG. 5 is a flow chart illustrating process 500 for repairing a defective servo segment written on a magnetic recording media in accordance with one embodiment of the present invention. In accordance with an embodiment of the present invention, process 500 for repairing a defective servo segment of a servo sector having at least one servo track written on a magnetic recording media is performed within a pack writer with a magnetic transducer coupled with the pack writer. In accordance with an embodiment of the present invention, process 500 for repairing a defective servo segment of the servo sector having at least one servo track written on a magnetic recording media is performed within a hard disk drive with a magnetic transducer coupled with the hard disk drive. In accordance with an embodiment of the present invention, process 500 for repairing a defective servo segment of the servo sector having at least one servo track written on a magnetic recording media is performed within a media writer with a magnetic transducer coupled with an HGA.

In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 500, such components are examples of components for carrying out process 500. That is, the embodiments of the present invention are well suited to performing various other components or variations of the components recited in FIG. 5. Within the present embodiment, it should be appreciated that the components of process 500 may be performed by software, by hardware, by an assembly mechanism, through human interaction, or by any combination of software, hardware, assembly mechanism, and human interaction.

Process 500 will be described with reference to elements shown in FIG. 1, FIG. 2, FIG. 3, FIG. 4a, FIG. 4b, FIG. 4c, and FIG. 4d.

In one embodiment, as shown at 510 of process 500, magnetic recording media 222 is mapped for location of at least one defective servo segment (410a, 410b, 410c) of servo sector (240a, 240b, 240c). In accordance with an embodiment of the present invention, and as shown at 515 of process 500, mapping magnetic recording media 222 comprises scanning magnetic recording media 222 with magnetic transducer 215 coupled within a pack writer. In accordance with another embodiment of the present invention, and as shown at 517 of process 500, mapping magnetic recording media 222 comprises scanning magnetic recording media 222 with magnetic transducer 215 coupled within HDD 100.

Mapping defective servo segments (410a, 410b, 410c) on magnetic recording media 222 provides a map of the location of defective servo segment (410a, 410b, 410c) by which defective servo segment (410a, 410b, 410c) can be located for repairing at least one defective servo track at this location and thereby benefit from the embodiments of the present invention.

Presently known techniques for repairing defective servo segments have been to erase substantially all servo segments from magnetic recording media 222 and restart the servowrite process, or monitor the poor quality rate and/or density of defective servo segments and change the operating parameters of the servowrite process in an attempt to control the poor quality rate and/or density of defective servo segments. Examples of such servowrite operating parameters are: temperature of the servowrite system; disk rotational speed; and ambient vibrations coming into the servowrite system. Neither of these techniques focuses on repairing defective servo tracks.

Figure 4B:
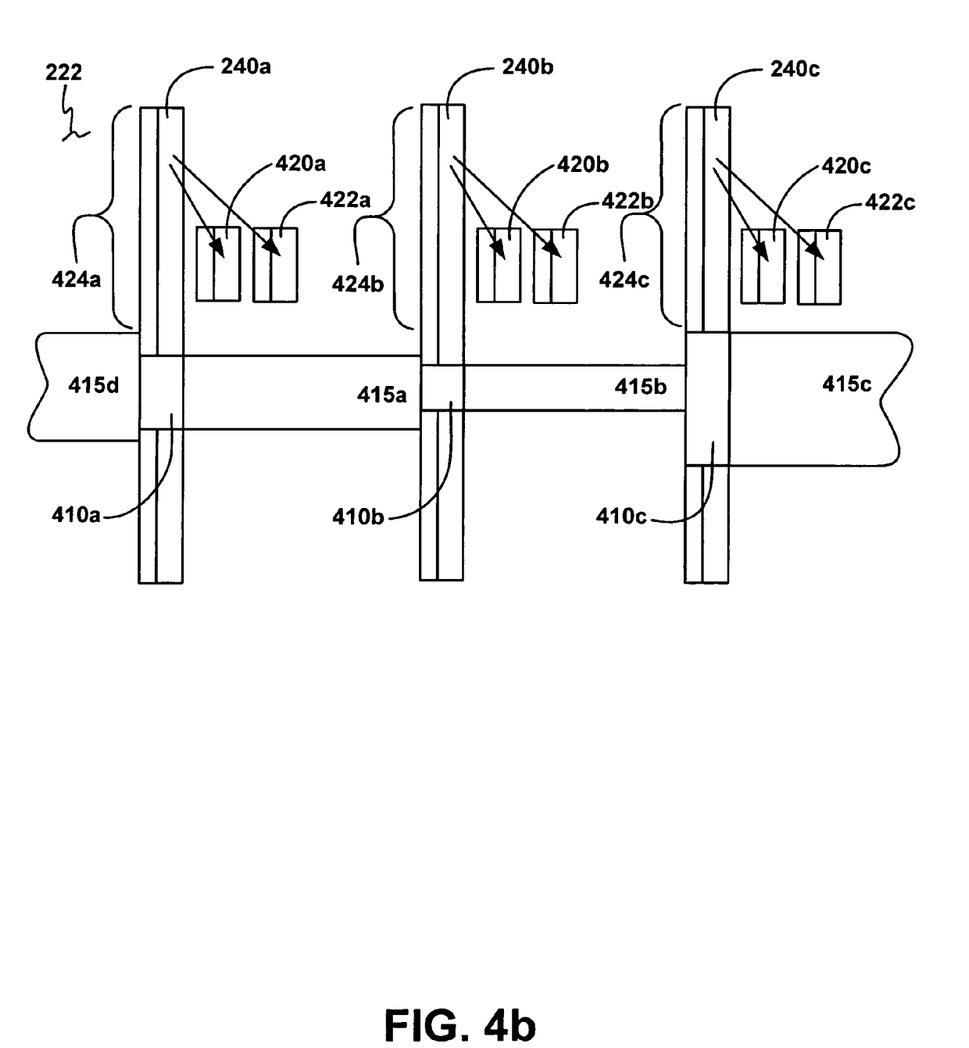
FIG. 4b is a diagram of the repair of defective servo segments written on a magnetic recording media in accordance with one embodiment of the present invention.

In one embodiment, as shown at 520 of process 500, and presented in FIG. 4b, non-defective segment (424a, 424b, 424c) of servo sector (240a, 240b, 240c) is replicated on magnetic recording media 222 in a customer data zone. A customer data zone is any portion of magnetic recording media 222 that is used by a customer for storing and retrieving a customer's data and is not used for HDD operational functions such as servo. By replicating non-defective segment (424a, 424b, 424c) of servo sector (240a, 240b, 240c) at least once, at least one good servo segment copy (420a, 420b, 420c, 422a, 422b, 422c) of servo sector (240a, 240b, 240c) is created.

In accordance with an embodiment of the present invention, and presented in FIG. 4b, good servo segment copy (420a, 420b, 420c, 422a, 422b, 422c) of servo sector (240a,

240b, 240c) is created adjacent to non-defective segment (424a, 424b, 424c) of servo sector (240a, 240b, 240c) in the customer data zone. In accordance with another embodiment of the present invention, a good servo segment copy, such as good servo segment copy 420a of servo sector 240a, is created in the customer data zone between non-defective segment 424a of servo sector 240a, and a next following servo sector, such as servo sector 240b.

Figure 4C:
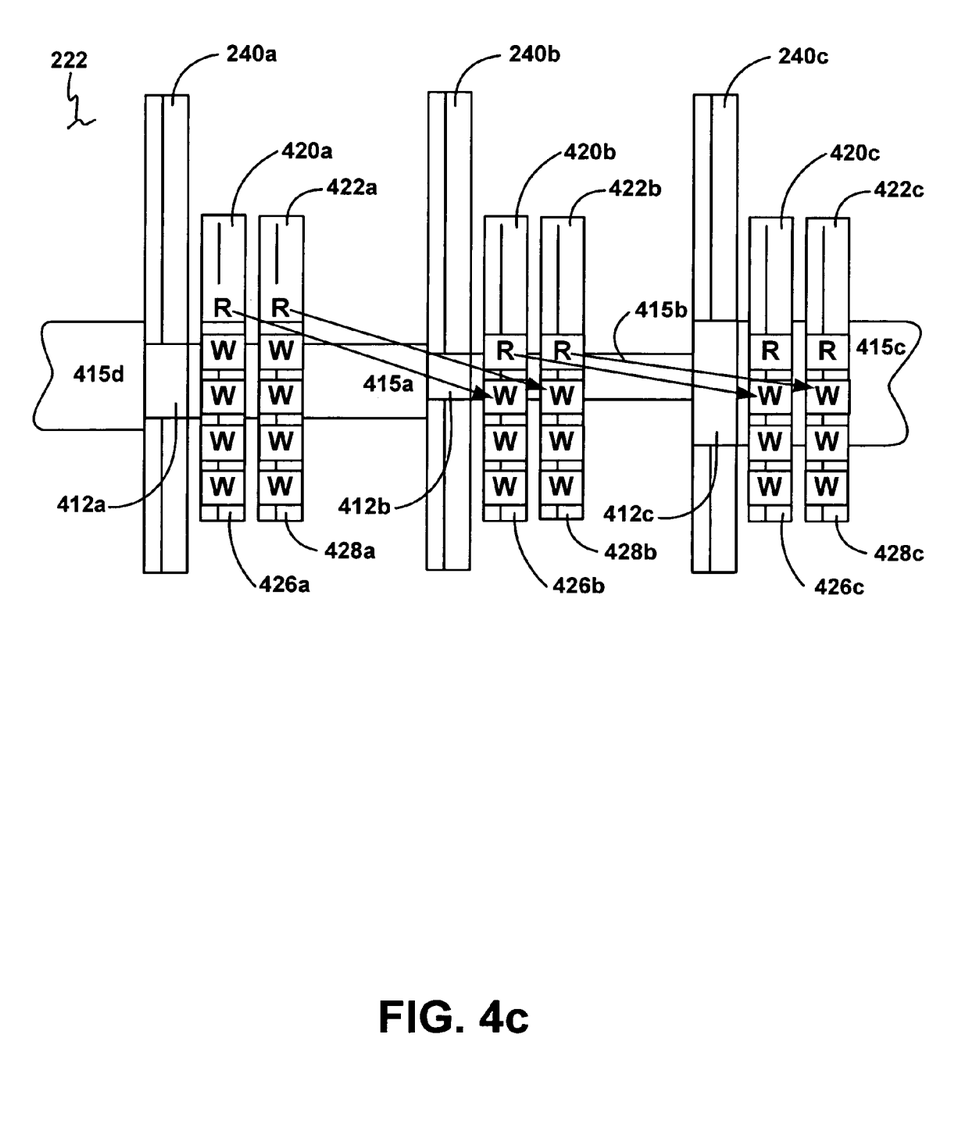
FIG. 4c is a diagram of the repair of defective servo segments written on a magnetic recording media in accordance with one embodiment of the present invention.

In one embodiment, as shown at 530 of process 500, and presented in FIG. 4c, defective servo segment (410a, 410b, 410c) of servo sector (240a, 240b, 240c), which is written on magnetic recording media 222, is erased. In accordance with an embodiment of the present invention, and as shown at 535 of process 500, defective servo segment (410a, 410b, 410c) of servo sector (240a, 240b, 240c), which is written on magnetic recording media 222, is erased by writing with magnetic transducer 215 an erase pattern over defective servo segment (410a, 410b, 410c) with product data write channel 345 coupled with HDD 100. Erasing defective servo segment (410a, 410b, 410c) results in servo segment vacancy (412a, 412b, 412c). Servo segment vacancy (412a, 412b, 412c) provides an area of magnetic recording media that is free of extraneous defective servo data which may interfere with writing good servo tracks (430a, 430b, 430c).

In the spirit of the embodiments of the present invention, element 530 of process 500 may be omitted and the writing of good servo tracks (430a, 430b, 430c) over defective servo segment (410a, 410b, 410c) may be relied upon to sufficiently erase defective servo segment (410a, 410b, 410c).

In one embodiment, as shown at 540 of process 500, and presented in FIG. 4c, good servo segment copy (420a, 420b, 420c, 422a, 422b, 422c) is propagated through customer data zone (415a, 415b, 415c, 415d) associated with defective servo segment (410a, 410b, 410c). In accordance with an embodiment of the present invention and 545 of process 500, propagating good servo segment copy (420a, 420b, 420c, 422a, 422b, 422c) through customer data zone (415a, 415b, 415c, 415d) comprises magnetic transducer 215 writing with product data write channel 345 coupled with HDD 100. Propagating good servo segment copy (420a, 420b, 420c, 422a, 422b, 422c) through customer data zone (415a, 415b, 415c, 415d) results in propagated servo segment (426a, 426b, 426c, 428a, 428b, 428c). Propagated servo segment (426a, 426b, 426c, 428a, 428b, 428c) presents magnetic transducer 215 with servo tracks that are operable for locating and servoing to defective servo segment (410a, 410b, 410c).

Propagated servo segment (426a, 426b, 426c, 428a, 428b, 428c) which extends through customer data zone (415a, 415b, 415c, 415d) associated with defective servo segment (410a, 410b, 410c) is accomplished with a process known as ping-pong. Ping-pong is an iterative process well known to one of ordinary skill in the art whereby magnetic transducer 215 reads initial data from a first location on magnetic recording media 222, writes the same initial data to a second location, reads the written initial data from the second location and writes the same initial data adjacent to the first location, such that the initial data is propagated across an area of magnetic recording media 222. In accordance with an embodiment of the present invention, the read operation of ping-pong is also a servo operation whereby magnetic transducer 215 is enabled to locate and servo on customer data zone (415a, 415b, 415c, 415d) associated with defective servo segment (410a, 410b, 410c) and locate and servo on defective servo segment (410a, 410b, 410c).

FIG. 4a, FIG. 4b, FIG. 4c, and FIG. 4d present pairs of good servo segment copies (420a, 422a), (420b, 422b), and (420c, 422c) as well as resulting pairs of propagated servo segments (426a, 426b), (426c, 428a), and (428b, 428c). Pairs are presented for the sake of presenting ping-pong with clarity. In the spirit of embodiments of the present invention, one good servo segment copy, such as good servo segment copy 420a may be written on magnetic recording media 222 and more than one propagated servo segment, such as propagated servo segments 426a, 426b, 426c, 428a, 428b, and 428c may be propagated from good servo segment copy 420a.

Figure 4D:
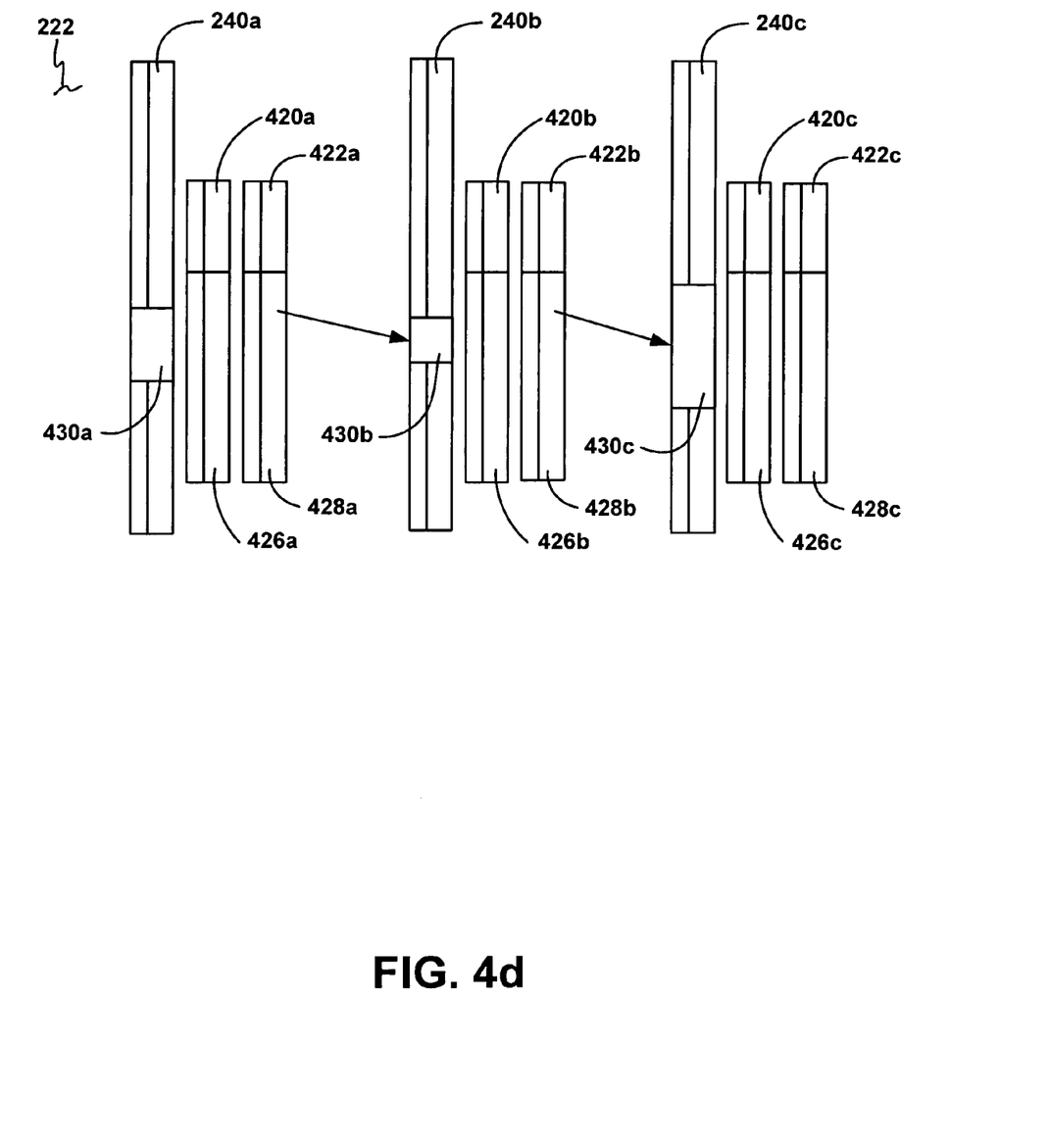
FIG. 4d is a diagram of the repair of defective servo segments written on a magnetic recording media in accordance with one embodiment of the present invention.

In one embodiment, as shown at 550 of process 500, and presented in FIG. 4d, a good servo segment copy, such as 420a, 422a, 420b, 422b, 420c, and 422c is copied onto magnetic recording media 222 previously occupied by a defective servo segment, such as 410a, 410b, and 410c of a servo sector such as 240a, 240b, and 240c. The good servo segment (420a, 422a, 420b, 422b, 420c, and 422c) having been propagated as propagated servo segment (426a, 426b, 426c, 428a, 428b, and 428c) is copied into defective servo segment (410a, 410b, and 410c) resulting in good servo tracks (430a, 430b, 430c).

The present invention, in the various presented embodiments provides for the fast and economic repair of defective servo tracks. The costly rework process of bulk erasing all the servo data on a disk stack and reinitiating servo write is avoided. Embodiments of the present invention avoid the manufacturing cost of installing servowrite equipment to support the existing defective servo track rework process as well as the added time required to bulk erase disk stacks and re-servowriting the reworked disk stacks.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for repairing at least one defective servo segment of a servo sector having at least one defective servo track written on a magnetic recording media, said method comprising:

mapping said magnetic recording media for locations of said defective servo segment of said servo sector;

replicating a non-defective segment of said servo sector at least once on said magnetic recording media in a customer data zone, thereby creating at least one good servo segment copy of said servo sector;

propagating said good servo segment copy through said customer data zone associated with said defective servo segment; and copying said good servo segment copy onto said magnetic recording media previously occupied by said defective servo segment of said servo sector.

2. The method of claim 1, wherein said repairing said defective servo segment of said servo sector having at least one servo track written on said magnetic recording media comprises:

repairing said servo track within a pack writer with a magnetic transducer coupled with said pack writer.

3. The method of claim 1, wherein said repairing said defective servo segment of said servo sector having at least one servo track written on said magnetic recording media comprises:

repairing said servo track within a hard disk drive with a magnetic transducer coupled with said hard disk drive.

4. The method of claim 1, wherein said replicating a non-defective segment of said servo sector comprises:
creating said good servo segment copy of said servo sector in said customer data zone between said non-defective segment of said servo sector and a next following servo sector.

5. The method of claim 1, wherein said replicating a non-defective segment of said servo sector comprises:
creating said good servo segment copy of said servo sector adjacent to said non-defective segment of said servo sector in said customer data zone.

6. The method of claim 2, wherein said mapping said defective servo segment of said servo sector on said magnetic recording media, comprises:
scanning said magnetic recording media with said magnetic recording transducer coupled within said pack writer.

7. The method of claim 3, wherein said mapping said defective servo segment of said servo sector on said magnetic recording media, comprises:
scanning said magnetic recording media with said magnetic recording transducer coupled within said hard disk drive.

8. The method of claim 3, wherein said erasing said defective servo segment of said servo sector written on said magnetic recording media, comprises:
writing with said magnetic transducer an erase pattern over said defective servo segment with a product data write channel coupled with said hard disk drive.

9. The method of claim 3, wherein said propagating said good servo segment copy and said copying said good servo segment copy, comprises:
writing with said magnetic transducer said good servo segment with a product data write channel coupled with said hard disk drive.

10. A computer-readable memory containing executable instructions, wherein
said instructions when executed effect a method for repairing at least one defective servo segment of a servo sector having at least one defective servo track written on a magnetic recording media, said method comprising:
mapping said magnetic recording media for locations of said defective servo segment of said servo sector;
replicating a non-defective segment of said servo sector at least once on said magnetic recording media in a customer data zone, thereby creating at least one good servo segment copy of said servo sector;
propagating said good servo segment copy through said customer data zone associated with said defective servo segment; and
copying said good servo segment copy onto said magnetic recording media previously occupied by said defective servo segment of said servo sector.

11. The computer-readable memory as described in claim 10, wherein said repairing said defective servo segment of said servo sector having at least one servo track written on said magnetic recording media comprises:
repairing said servo track within a pack writer with a magnetic transducer coupled with said pack writer.

12. The computer-readable memory as described in claim 10, wherein said repairing said defective servo segment of said servo sector having at least one servo track written on said magnetic recording media comprises:
repairing said servo track within a hard disk drive with a magnetic transducer coupled with said hard disk drive.

13. The computer-readable memory as described in claim 10, wherein said replicating a non-defective segment of said servo sector comprises:
creating said good servo segment copy of said servo sector in said customer data zone between said non-defective segment of said servo sector and a next following servo sector.

14. The computer-readable memory as described in claim 10, wherein said replicating a non-defective segment of said servo sector comprises:
creating said good servo segment copy of said servo sector adjacent to said non defective segment of said servo sector in said customer data zone.

15. The computer-readable memory as described in claim 10, wherein said mapping said defective servo segment of said servo sector on said magnetic recording media, comprises:
scanning said magnetic recording media with said magnetic recording transducer coupled within said pack writer.

16. The computer-readable memory as described in claim 11, wherein said mapping said defective servo segment of said servo sector on said magnetic recording media, comprises:
scanning said magnetic recording media with said magnetic recording transducer coupled within said hard disk drive.

17. The computer-readable memory as described in claim 11, wherein erasing said defective servo segment of said servo sector written on said magnetic recording media, comprises:
writing with said magnetic transducer an erase pattern over said defective servo segment with a product data write channel coupled with said hard disk drive.

18. The computer-readable memory as described in claim 11, wherein said propagating said good servo segment copy and said copying said good servo segment copy, comprises:
writing with said magnetic transducer said good servo segment with a product data write channel coupled with said hard disk drive.

* * * * *